(12) United States Patent
Heitzler et al.

(10) Patent No.: US 8,418,476 B2
(45) Date of Patent: Apr. 16, 2013

(54) MAGNETOCALORIC GENERATOR

(75) Inventors: Jean-Claude Heitzler, Horbourg-Wihr (FR); Christian Muller, Strasbourg (FR)

(73) Assignee: Cooltech Applications S.A.S., Holtzheim (FR)

( * ) Notice: Subject to any disclaimer, the term of this patent is extended or adjusted under 35 U.S.C. 154(b) by 309 days.

(21) Appl. No.: 12/745,062

(22) PCT Filed: Nov. 25, 2008

(86) PCT No.: PCT/FR2008/001639
§ 371 (c)(1),
(2), (4) Date: May 27, 2010

(87) PCT Pub. No.: WO2009/098391
PCT Pub. Date: Aug. 13, 2009

(65) Prior Publication Data
US 2010/0300118 A1 Dec. 2, 2010

(30) Foreign Application Priority Data

Dec. 4, 2007 (FR) ...................................... 07 08472

(51) Int. Cl.
*F25B 21/00* (2006.01)
(52) U.S. Cl.
USPC ............................................. 62/3.1; 62/467
(58) Field of Classification Search ...................... 62/3.1, 62/467, 324.2
See application file for complete search history.

(56) References Cited

U.S. PATENT DOCUMENTS

| 4,642,994 | A  | * | 2/1987  | Barclay et al. ................... 62/3.3 |
| 5,249,424 | A  | * | 10/1993 | DeGregoria et al. ............. 62/3.1 |
| 6,332,323 | B1 | * | 12/2001 | Reid et al. ........................... 62/6 |
| 6,526,759 | B2 | * | 3/2003  | Zimm et al. ...................... 62/3.1 |
| 6,758,046 | B1 | * | 7/2004  | Barclay et al. ................... 62/3.1 |
| 7,211,169 | B2 | * | 5/2007  | Noble ......................... 156/583.1 |
| 7,481,064 | B2 | * | 1/2009  | Kitanovski et al. ............. 62/3.1 |
| 7,596,955 | B2 |   | 10/2009 | Muller et al. |

(Continued)

FOREIGN PATENT DOCUMENTS

| EP | 1 736 719 A1 | 12/2006 |
| FR | 2 875 895 A1 | 3/2006 |

(Continued)

*Primary Examiner* — Mohammad Ali
(74) *Attorney, Agent, or Firm* — Davis & Bujold, PLLC (57) ABSTRACT

A generator comprising at least one thermal stage having magnetocaloric elements (2) arranged around an axis and a magnetic arrangement (3) supported by a drive shaft (30) that rotates about the axis to subject the elements to a variation in magnetic field. The generator comprises pistons (70) to force heat transfer fluid through the elements with the pistons being driven in reciprocating translation within chambers (73) by at least one cam (71) that is rotationally driven the drive shaft (30). The generator comprises a forced circulation unit (8a) having planet gears (80) arranged around the central axis, supported by the body (72) of the generator and meshing with an inner crown gear (81) integral with the cam (71). Each gear (80) forms a gear pump that mixes the heat transfer fluid and places the fluid in forced circulation in the tanks (74) and the chambers (73).

9 Claims, 9 Drawing Sheets

U.S. PATENT DOCUMENTS

| | | | |
|---|---|---|---|
| 2004/0031514 A1* | 2/2004 | Bell | 136/203 |
| 2004/0093877 A1* | 5/2004 | Wada et al. | 62/114 |
| 2004/0231338 A1* | 11/2004 | Saito et al. | 62/3.1 |
| 2005/0000230 A1* | 1/2005 | Saito et al. | 62/3.1 |
| 2005/0194299 A1* | 9/2005 | Max | 210/177 |
| 2006/0144048 A1* | 7/2006 | Schulz | 60/641.8 |
| 2006/0278373 A1* | 12/2006 | Hsu | 165/104.33 |
| 2007/0130960 A1* | 6/2007 | Muller et al. | 62/3.1 |
| 2007/0248482 A1 | 10/2007 | Yoshii et al. | |
| 2008/0236172 A1 | 10/2008 | Muller et al. | |

FOREIGN PATENT DOCUMENTS

| | | |
|---|---|---|
| FR | 2 890 158 A1 | 3/2007 |
| FR | 2 901 325 A1 | 11/2007 |
| FR | 07/07612 | 5/2009 |
| GB | 2 086 481 A | 5/1982 |
| WO | 2005/043052 A1 | 5/2005 |

* cited by examiner

MAGNETOCALORIC GENERATOR

This application is a National Stage completion of PCT/FR2008/001639 filed Nov. 25, 2008, which claims priority from French patent application serial no. 07/08472 filed Dec. 4, 2007.

TECHNICAL SCOPE

The present invention relates to a magnetocaloric generator comprising at least one thermal stage fitted with active elements made of a magnetocaloric material and arranged around a central axis, a magnetic arrangement supported by a drive shaft rotated around the central axis by an actuator, and arranged to subject the active elements to a variation in magnetic field, at least one heat transfer fluid contained in the generator and pushed through the active elements by pushing means, at least one so-called cold exchange chamber and one so-called hot exchange chamber designed to be respectively coupled to external utilization circuits, the generator also comprising means for the forced circulation of the heat transfer fluid coupled to the drive shaft so as to be driven by the same actuator as that of the magnetic arrangement.

PRIOR TECHNIQUE

Magnetic refrigeration technology has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the active elements made of magnetocaloric material, the heat exchange surface between the heat transfer fluid and these active elements, the performances of the heat exchangers, etc.

The magnetocaloric generator described in the previous patent application submitted under reference FR 07/07612 by the same applicant comprises one or more thermal modules that are stacked to form one or more thermal stages, each comprising N adjacent active elements made of magnetocaloric material, arranged in a circle around a central axis and subjected to a variation in magnetic field so as to vary their temperature. These active elements are associated with N pistons subjected to a reciprocating translation movement by an actuating cam in order to push the heat transfer fluid contained in the thermal module in two opposite directions at the same time, so that a first fraction of the heat transfer fluid is pushed through the active elements subjected to a heating cycle towards a so-called hot exchange chamber, and that a second fraction of the heat transfer fluid is pushed through the active elements subjected to a cooling cycle towards a cold exchange chamber, and inversely. One thus obtains a number N of mini or micro heat generators operating simultaneously and in parallel, allowing the heat exchange surface between the active elements and the heat transfer fluid to be multiplied by the coefficient N, thus increasing the calorific power of such a generator. Moreover, each magnetic cycle is optimally used since the movement of the heat transfer fluid in both directions of circulation allows the simultaneous collection of the calories produced by the active elements subjected to an increase in magnetic field (heating cycle) and of the frigories produced by the active elements subjected to a reduction in magnetic field (cooling cycle), with no idle time nor lost cycle.

In addition, other magnetocaloric generators are known, in which the heat transfer fluid is forced to circulate by a double external pump or two external pumps, inserted between the generator and the external circuits that notably comprise heat exchangers. One of the examples is described in publication WO 2005/043052 submitted by the same applicant. In this type of generator, the pumps are of a known type and must be powered to enable them to operate, in particular with electric current, which reduces the overall energy efficiency of the generator. To circumvent this disadvantage, publication FR 2 875 895 proposes to couple the circulating pump of the heat transfer fluid to the drive means of the generator.

SUMMARY OF THE INVENTION

The present invention aims to improve the efficiency of a magnetocaloric generator in order to increase its calorific power and its economic profitability, while preserving its modular aspect which makes it easy to configure according to given specifications as part of industrial as well as domestic applications.

For that purpose, the invention concerns a magnetocaloric generator of the kind mentioned in the preamble, characterized in that the means of forced circulation are integrated into the inner volume of the generator.

Thanks to this construction, the generator is fitted with means of forced circulation to ensure that the fluid is mixed inside the generator, which allows a systematic renewal of the fluid pushed through the active elements. Moreover, these means of forced circulation are activated by a single actuator. This allows the calorific power of the generator to be increased without reducing its energy efficiency.

In the case where the pushing means comprise at least one piston arranged to push the heat transfer fluid through the active elements and driven into reciprocating translation by at least one cam coupled in rotation to the drive shaft, the means of forced circulation may comprise at least one piston pump with at least one central piston freely supported by the drive shaft and driven into reciprocating translation by the cam. In this case, the cam may be fitted with an inner crown gear coupled in rotation to the drive shaft by means of a planetary gear train.

The means of forced circulation may also comprise small planet gears arranged around the central axis, supported by the body of the generator and meshing with an inner crown gear integral with the cam, and fluid passages, with each small planet gear forming a mini gear pump. These means of forced circulation may moreover comprise at least one turbine coupled to the drive shaft.

In an alternative embodiment, the means of forced circulation may comprise at least one planet gear that meshes with a drive gear integral with the drive shaft and associated with a pump housing fitted with channels for the circulation of the heat transfer fluid, with the planet gear associated with the pump housing forming a gear pump.

In another alternative embodiment, the means of forced circulation may simultaneously form the pushing means.

In this case, the means of forced circulation may comprise two assemblies arranged on either side of the thermal stage and angularly offset, each assembly comprising planet gears arranged around the central axis, meshing with an inner crown gear integral with the body of the generator and each linked in rotation to one of the two toothed wheels of a gear that forms a mini gear pump, the gear being integrated in a ring driven in rotation by the drive shaft, and in that the assemblies comprise crossing passages that enable the fluid to circulate between the hot or cold exchange chamber concerned and the active elements.

BRIEF DESCRIPTION OF THE DRAWINGS

The present invention and its advantages will be better revealed in the following description of two embodiments given as a non limiting example, in reference to the drawings in appendix, in which.

DETAILED DESCRIPTION OF THE PREFERRED EMBODIMENTS

Figure 1:
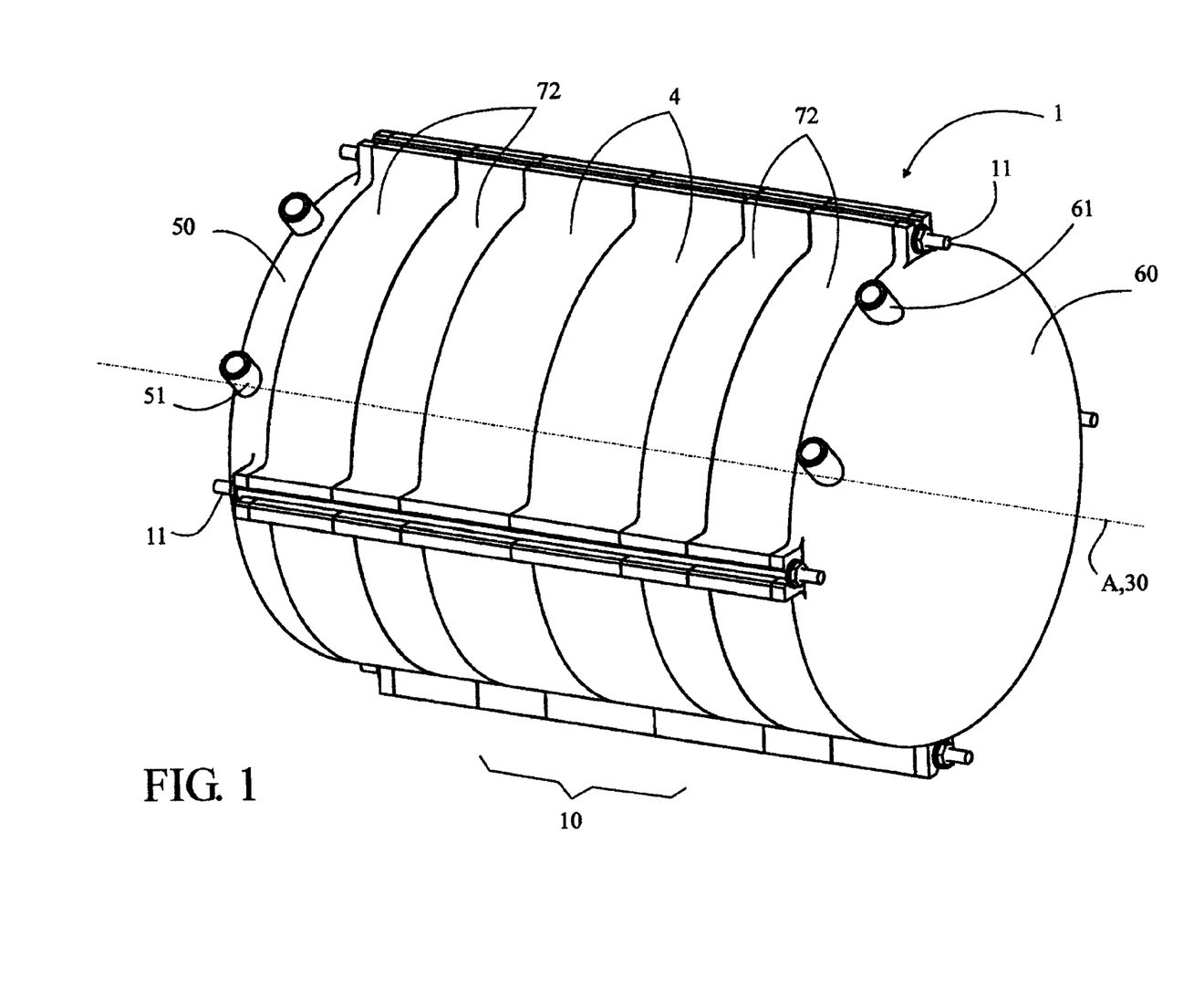
FIG. 1 is a perspective view of a magnetocaloric generator according to the invention with one thermal stage.
Figure 2:
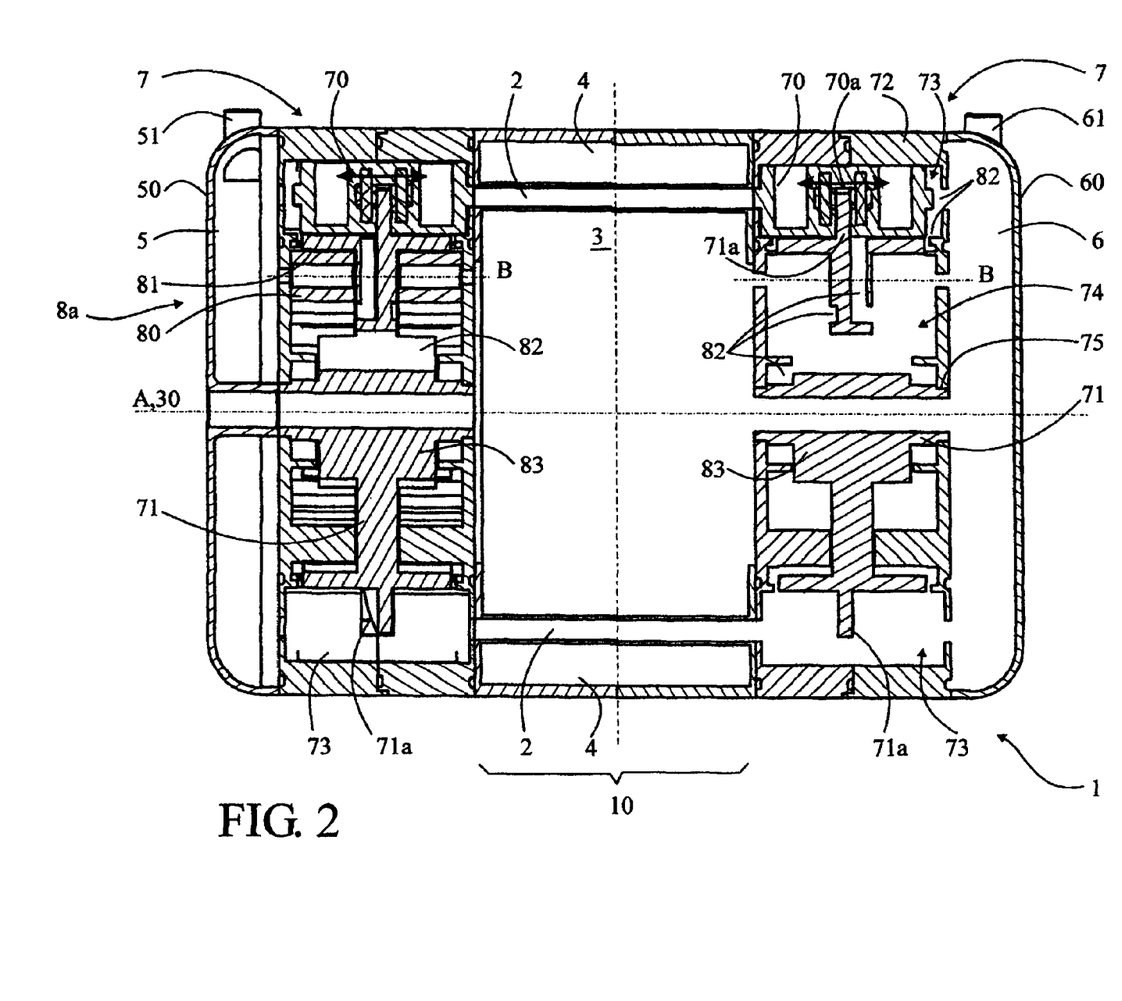
FIG. 2 is an axial section view of the generator from FIG. 1.

In reference to FIGS. 1 and 2, the magnetocaloric generator 1 according to the invention, referred to as generator 1 thereafter, includes at least one thermal stage 10 comprising active elements 2 made of magnetocaloric material, arranged in a crown around a central axis A, and subjected to a variation in magnetic field to vary their temperature according to the Carnot cycle, and to alternately create a heating cycle and a cooling cycle in these active elements 2. The number of thermal stages 10 is determined according to the specifications of generator 1, and in particular to the desired temperature gradient, with each thermal stage 10 capable of constituting a nestable and stackable module. The variation in magnetic field is, for example, generated by means of a magnetic arrangement 3 arranged inside the active elements 2, rotated around central axis A by an actuator and associated with a field closing device 4 arranged outside the ring of active elements 2. This magnetic arrangement 3 may comprise permanent magnets or similar, supported by a drive shaft 30 (cf. FIGS. 3 and 7 to 9) symbolized on the other figures by central axis A, and driven into continuous or non continuous rotation, alternate or not, by any known type of actuator (not illustrated).

The active elements 2 may come in various forms, namely a crown formed by a single part or by an assembly of adjacent parts, with geometrical sections or not, made of perforated or micro-perforated solid material, porous material, powder or agglomerated particles, axial or radial laminate, etc. from a single magnetocaloric material or an assembly of various magnetocaloric materials, associated or not with other heat conducting materials.

This generator 1 contains at least one heat transfer fluid arranged to collect the calories and frigories produced by the active elements 2 during successive heating and cooling cycles, and to respectively store them in a so-called hot exchange chamber 5 and a so-called cold exchange chamber 6 placed at the hot and cold ends of the generator and closed by covers 50, 60. These exchange chambers 5, 6 are designed to exchange the calories and frigories collected with external utilization circuits via, for example, heat exchangers (not illustrated) connected to end fittings 51, 61.

More particularly in reference to FIG. 2, this generator 1 comprises, on either side of the thermal stage 10, means to push 7 the heat transfer fluid through the active elements 2, in the form of pistons 70 positioned opposite the active elements 2 and driven into reciprocating translation by at least one cam 71, integral with the drive shaft, itself rotated around the central axis A by the actuator that controls the rotation of the magnetic arrangement 3. In the case where the generator 1 comprises several thermal stages 10, the pushing means 7 may be common to two consecutive thermal stages 10. These pushing means 7 are housed in a hollow body 72, which may be arranged to assemble itself to the field closing device 4 on the one hand and to the covers 50, 60 on the other, in particular via stacking of complementary male/female shapes, as in the example of FIGS. 1 to 3. Evidently, any other means of assembly may be considered, with or without an outer casing. In the illustrated example, o-rings or similar (not illustrated) are inserted between each part to ensure the tightness of this assembly, which is kept tightened by tie rods 11 or similar, uniformly distributed about the periphery of the generator 1. In the same example illustrated on FIG. 2, the body 72 is made up of two radially-assembled half shells, delimiting a chamber 73 for the pistons 70 and a tank 74 that contains the heat transfer fluid. This body 72 also comprises bearings 75 to guide the cam 71 into rotation. The cam 71 comprises a cam profile 71a, sinusoidal for example, that moves inside a groove 70a located in each piston 70.

The generator 1 according to the first three embodiments of the invention distinguishes itself from the state of the art in that it comprises integrated means of forced circulation 8a, 8b, 8c arranged to create a forced circulation of the heat transfer fluid at least in the fluid tank(s) 74 and in the chamber(s) 73 of the pistons 70, depending on whether the generator 1 comprises one or more thermal stages 10, with these fluid tanks 74 being interconnected or not.

In all embodiments, the means of forced circulation 8a, 8b, 8c, 180 are designed to be integrated into the inner volume of the generator 1 as in the embodiments illustrated in FIGS. 2 to 12. In this case, they shift onto the drive shaft of the magnetic arrangement 3 and are driven by the same actuator, which allows for a compact construction and a single power supply.

These means of forced circulation 8a, 8b, 8c, 180 allow for the mixing of the heat transfer fluid in each tank 74, following a loop cycle or an alternate cycle depending on the type of means used, to mix the fluid before and after its passage through the active elements 2, namely the fraction of fluid with calories and the fraction of fluid with frigories, so as to balance the temperature of this fluid in each tank 74, and to constantly renew the fluid in the chambers 73 which is pushed through the active elements 2 by the pistons 70, which helps create and maintain a temperature gradient between the input and the output of the active elements 2, and hence simultaneously increase the temperature gradient between two consecutive thermal stages 10, and the overall thermal power of the generator 1.

Figure 3:
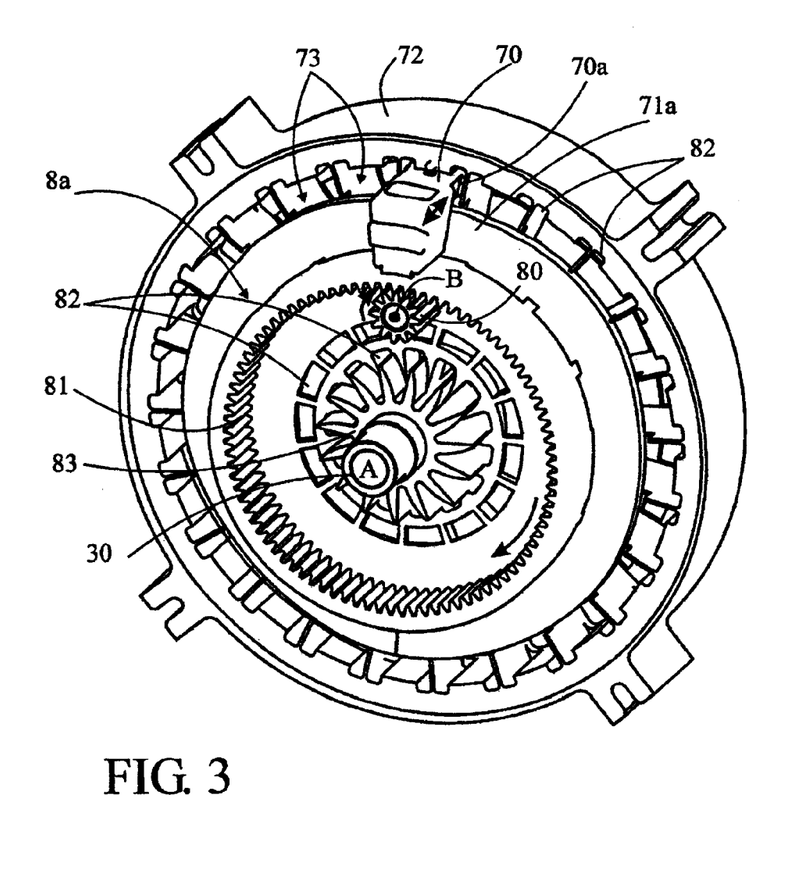
FIG. 3 is a partial perspective view of a first embodiment of the means of forced circulation of the heat transfer fluid of the generator from FIG. 1.
Figure 4:
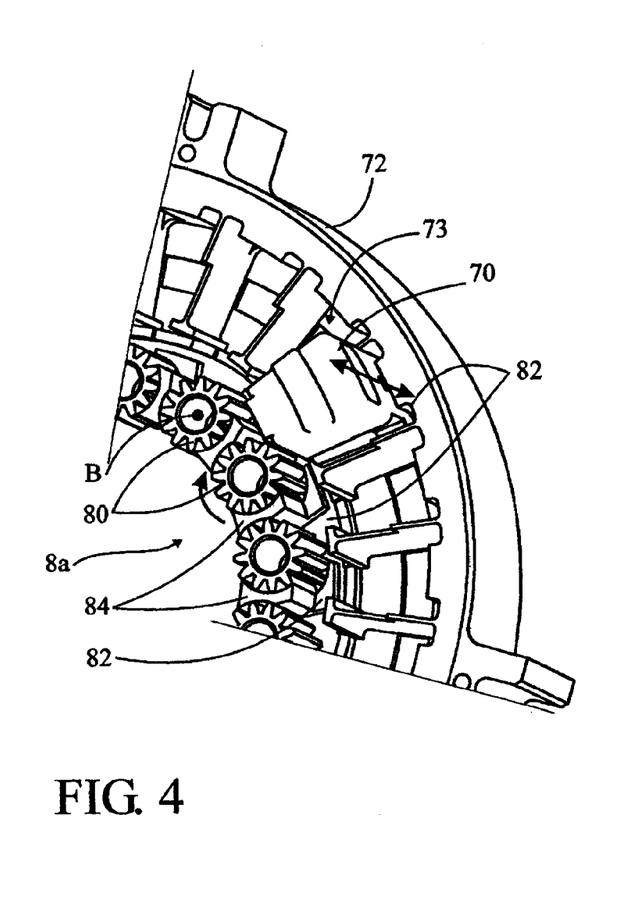
FIG. 4 is a zoomed in detail view of FIG. 3.

In the first embodiment illustrated in FIGS. 2 to 4, the means of forced circulation 8a comprise a set of small planet gears 80, arranged in circle around the central axis A, supported by the body 72 and free in rotation around axes B integral with the body 2. For clarity purposes, the right part of FIG. 2 is simplified and does not show the small gears 80, only one small gear 80 is illustrated in FIG. 3 and cam 71 is not illustrated in the detail of FIG. 4. These gears 80 mesh with a crown gear 81 integral with the cam 71 and rotated around the central axis A. The rotation of cam 71 rotates the crown gear 81, which in turn rotates the small gears 80 which operate like mini gear pumps, i.e. driving via their teeth the heat transfer fluid contained in the tank 74 towards the pistons 70 and the active elements 2, to drive the fluid into a loop circulation. For this purpose, the body 72 delimits a pump housing 84 for each small gear 80, and fluid passages 82 (cf. FIG. 4) in the form of channels, grooves, openings or similar, are located in the body 72 and in the cam 71 to connect, as soon as a passage in one of the chambers 73 opens, the tank 74 with the corresponding exchange chamber 5, 6 or a neighbouring tank 74 if the generator 1 comprises several thermal stages 10, on the one hand, and with the chamber 73 of the pistons 70 on the other. The small gears 80 are preferably arranged near the pistons 70. Thus, the fraction of heat transfer fluid pushed through the active elements 2 is constantly renewed. These means of forced circulation 8a also comprise a central turbine 83, integral with the cam 71 and rotated around the central axis A to further increase the mixing of the heat transfer fluid within the tank 74. For this purpose, the cam 71 comprises through fluid passages 82 near the blades of the turbine 83, which allow the heat transfer fluid to circulate through the turbine 83 and the cam 71. In this embodiment, the part that constitutes the cam 71 combines several functions: the drive of the pistons 70 in reciprocating translation to push the heat transfer fluid through the active elements 2, the drive of the small gears 80 to create mini gear pumps that force the circulation of the heat transfer fluid towards the pistons 70 and the active elements 2, and the forced mixing of the heat transfer fluid in the tank 74. Evidently and depending on the alternative embodiments, the cam 71 may be proposed with or without a turbine 83, and with or without the small gears 80.

Figure 5:
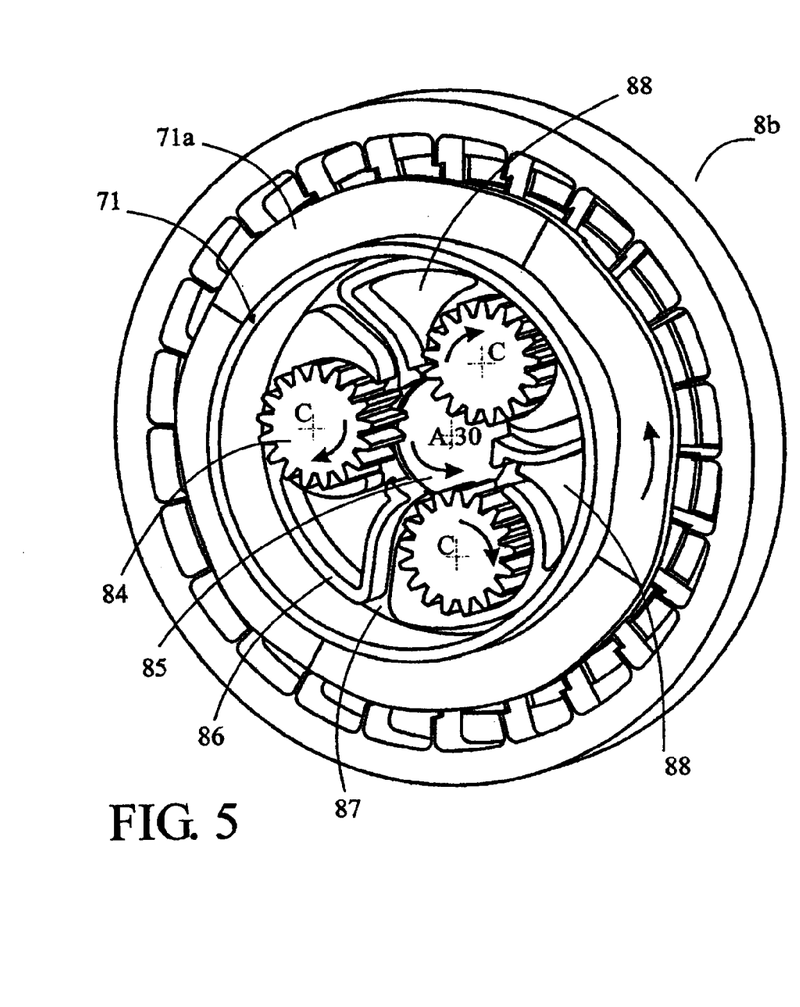
FIG. 5 is a partial perspective view of a second embodiment of the means of forced circulation of the heat transfer fluid.
Figure 6:
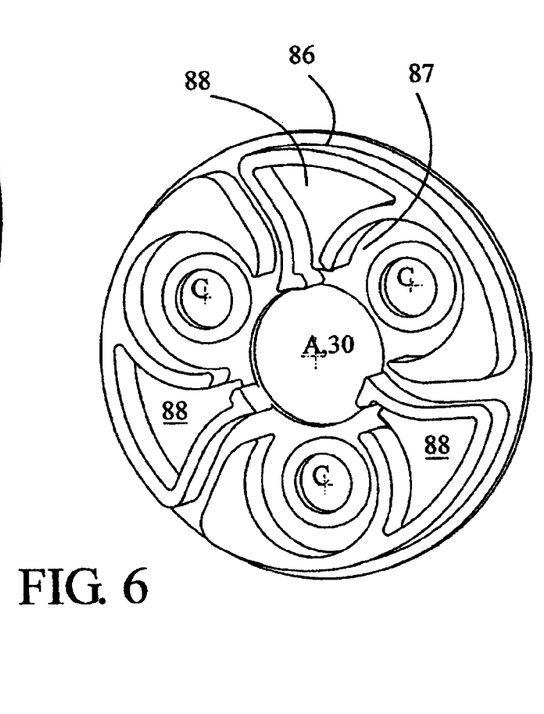
FIG. 6 is a perspective view of the pump housing that forms part of the means of forced circulation of FIG. 5.

In the second embodiment illustrated in FIGS. 5 and 6, the means of forced circulation 8b comprise at least one planet gear 84, and in the example illustrated three planet gears 84, with this number not being restrictive, arranged around the central axis A, at equal distance or not, supported by the body 72 and free in rotation around axes C integral with the body 2. These gears 84 mesh with a drive gear 85 (represented by a reference line in FIG. 5) integral with the cam 71 and rotated around the central axis A. The rotation of cam 71 rotates the drive gear 85, which in turn rotates the planet gears 84 which operate like mini gear pumps, i.e. driving via their teeth the heat transfer fluid contained in the tank 74 towards the pistons 70 and the active elements 2 to drive the fluid into a loop circulation. For this purpose, these gears 84 are associated with a fixed pump housing 86 mounted in the body 72, which has channels 87 for the circulation of the fluid around each gear 84, connected with the fluid passages 82 located in the cam 71 and the body 72 in reference to the previous example. This pump housing 86 also comprises through fluid passages 88 to enable the heat transfer fluid to circulate through the pump housing 86 and the cam 71. In this embodiment, the drive gear 85 also plays the role of the turbine 83 from the previous example, i.e. it increases the mixing of the heat transfer fluid in the tank 74.

Figure 7:
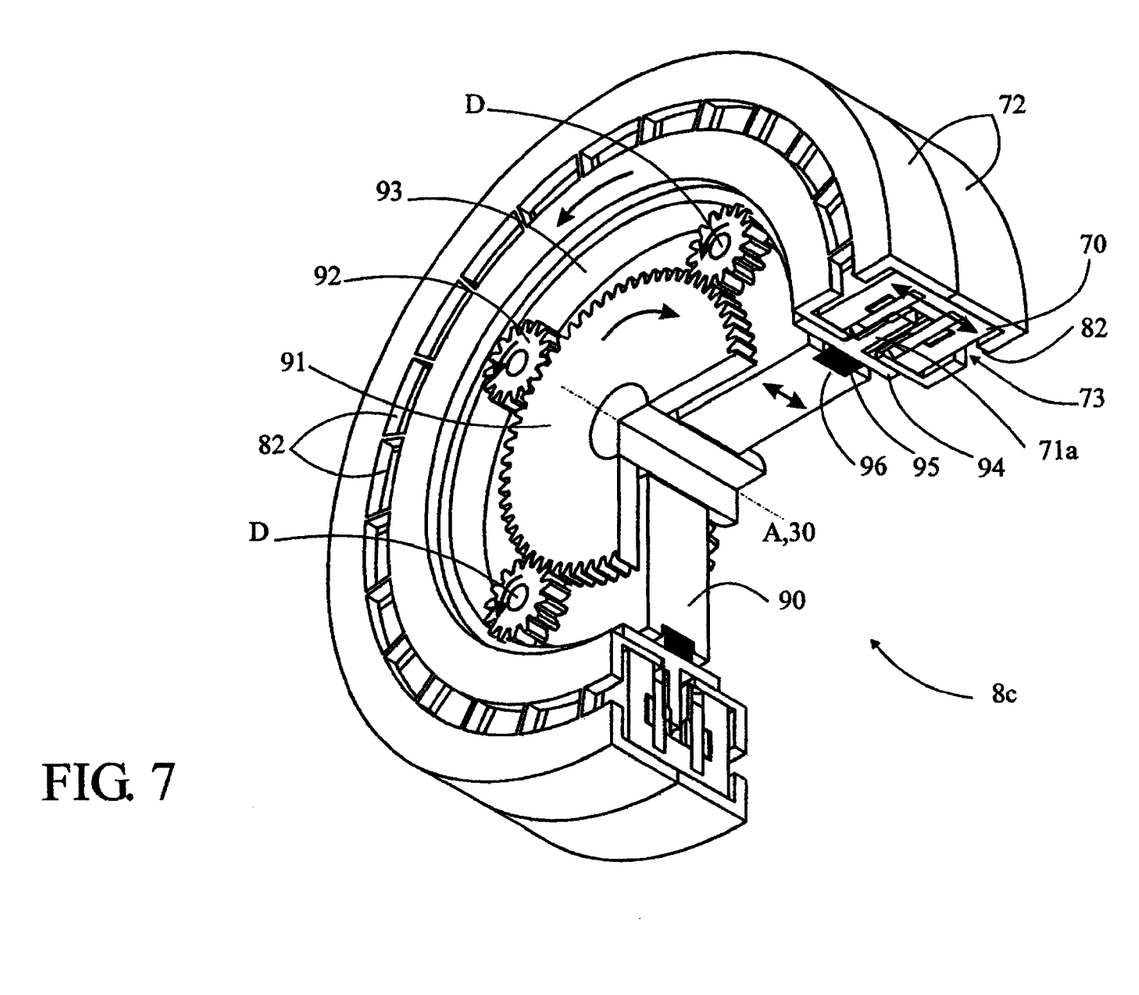
FIG. 7 is a partial section perspective view of a third embodiment of the means of forced circulation of the heat transfer fluid.
Figures 8, 9:
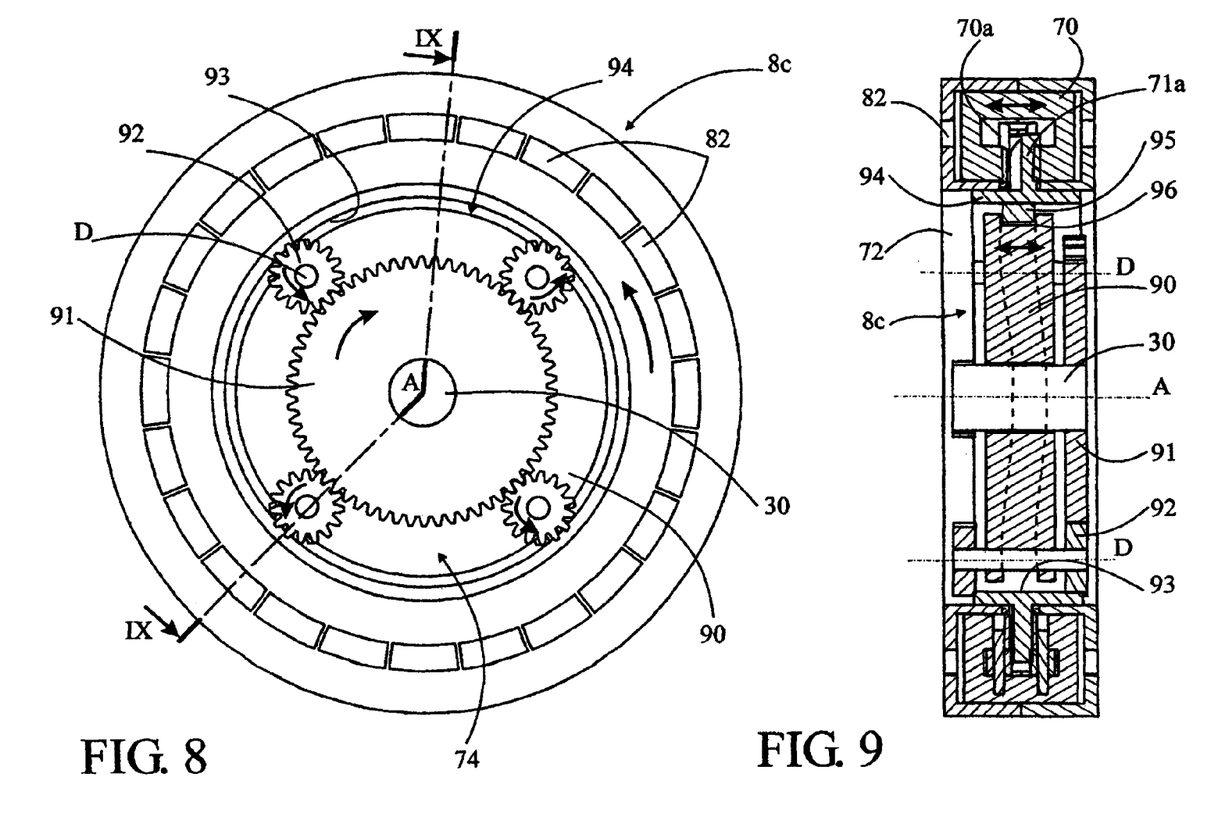
FIG. 8 is a plane view of FIG. 7.
FIG. 9 is an axial section view of FIG. 8 along line IX-IX.

In the third embodiment illustrated in FIGS. 7 to 9, the means of forced circulation 8c comprise a central piston 90 subjected to a reciprocating translation movement to operate like a piston pump and to create an alternate circulation of the fluid. This central piston 90 is mounted free in translation and in rotation on the drive shaft 30 of the magnetic arrangement 3. This drive shaft 30 supports a toothed wheel 91 that meshes with one or more gears 92, arranged in a circle around the central axis A, at equal distance or not, supported by the body 72 and free in rotation around axes D integral with the body 72. These gears 92 mesh with an inner crown gear 93 that rotates a cam 94 around the central axis A. The cam 94 has the same function as the cam 71 from the previous examples and comprises the same type of cam profile 71a moving inside the groove 70a of the pistons 70 to drive them into a reciprocating translation and push the heat transfer fluid in the active elements 2. This cam 94 simultaneously ensures the reciprocating translation movement of the central piston 90 by means of a follower finger 95 that moves in a cam path 96 located in the periphery of the central piston 90, this cam path 96 having an approximately sinusoidal shape (cf. FIG. 9). The axial stroke of the central piston 90 is limited by the body 72 on one side and by the toothed wheel 91 on the other. As in the previous examples, fluid passages 82 are located in the body 72 to allow the circulation of the heat transfer fluid between the tank(s) 74 and the chamber 73 of the pistons 70.

Figure 10:
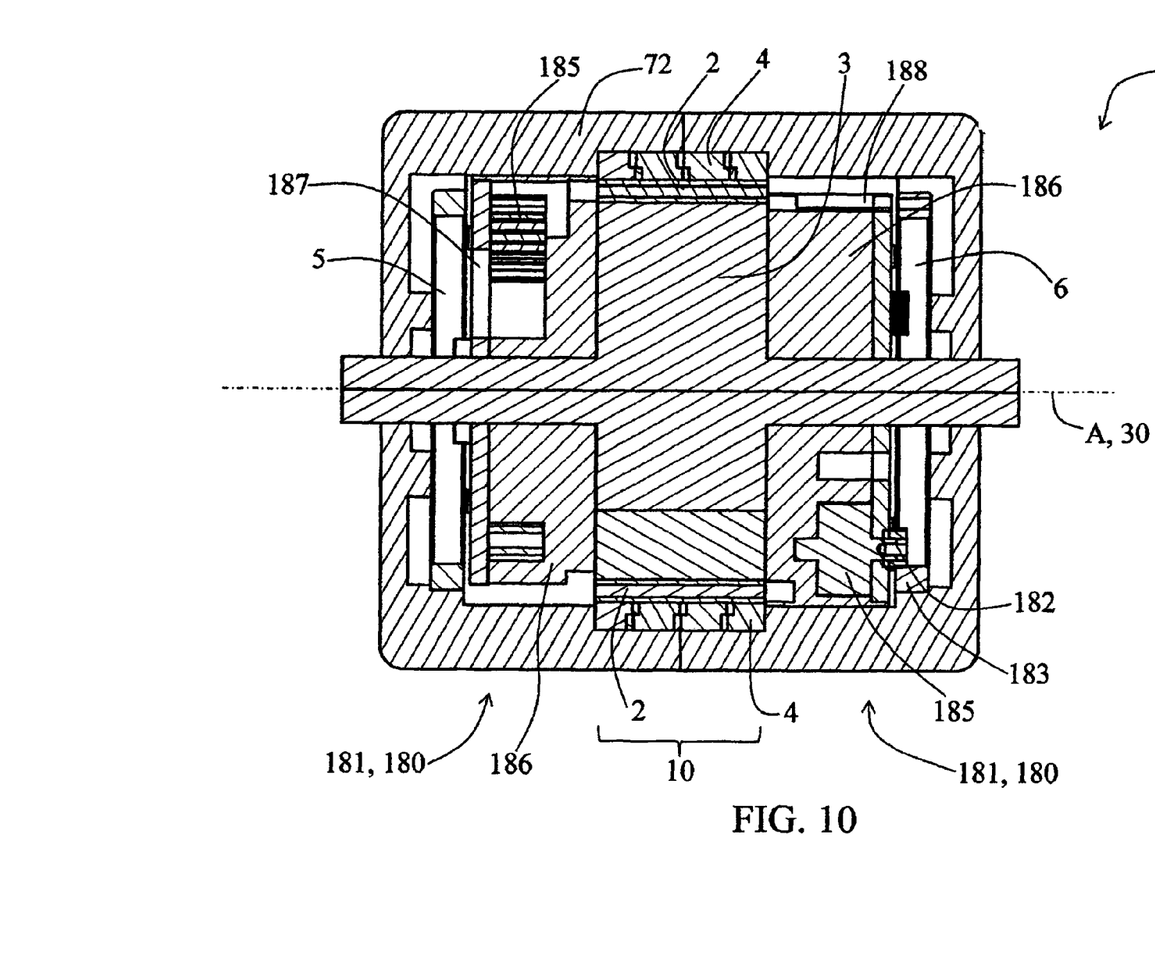
FIG. 10 is an axial section view of the generator from FIG. 1 associated with a fourth embodiment of the means of forced circulation of the heat transfer fluid.
Figure 11:
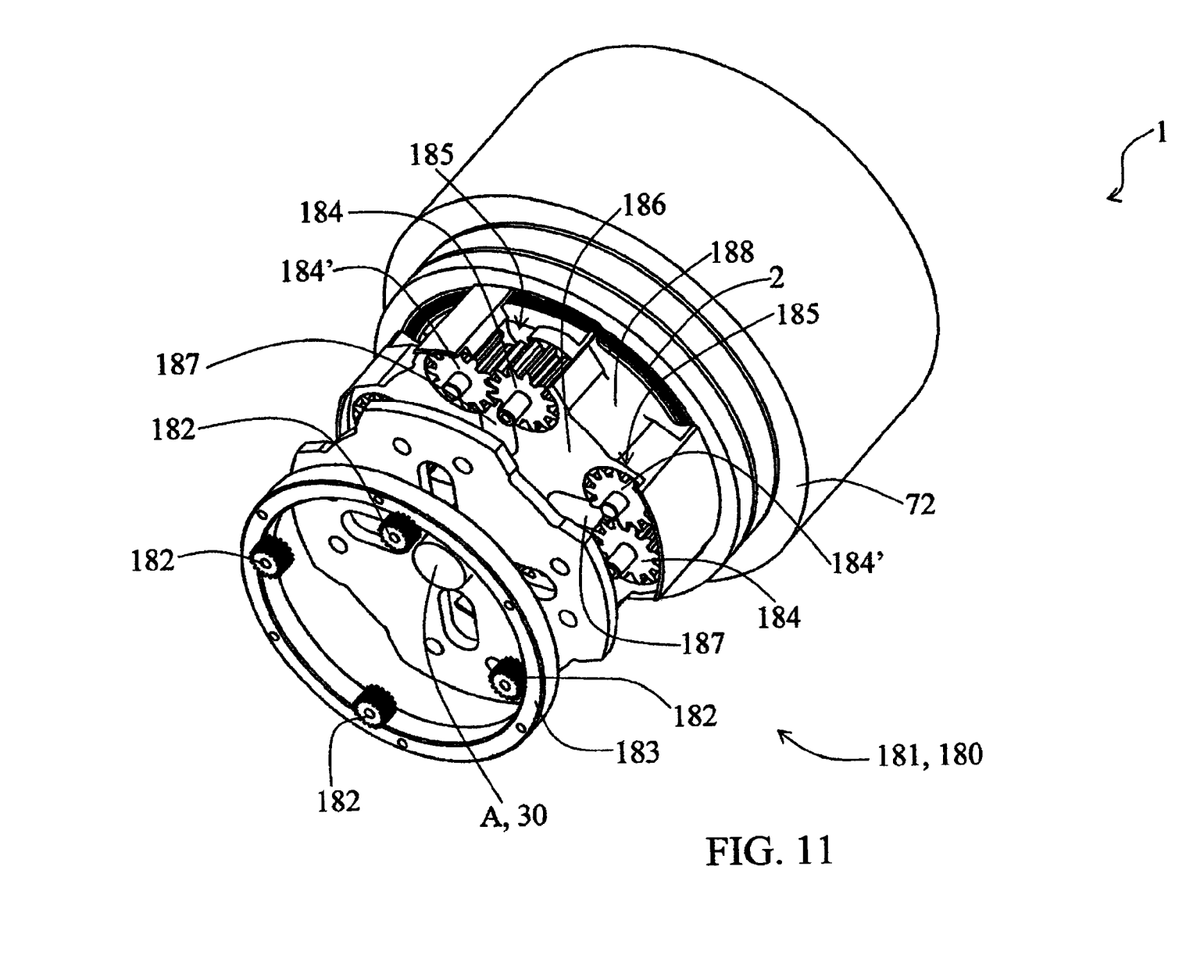
FIG. 11 is a simplified, partial section perspective view of the generator from FIG. 10.
Figure 12:
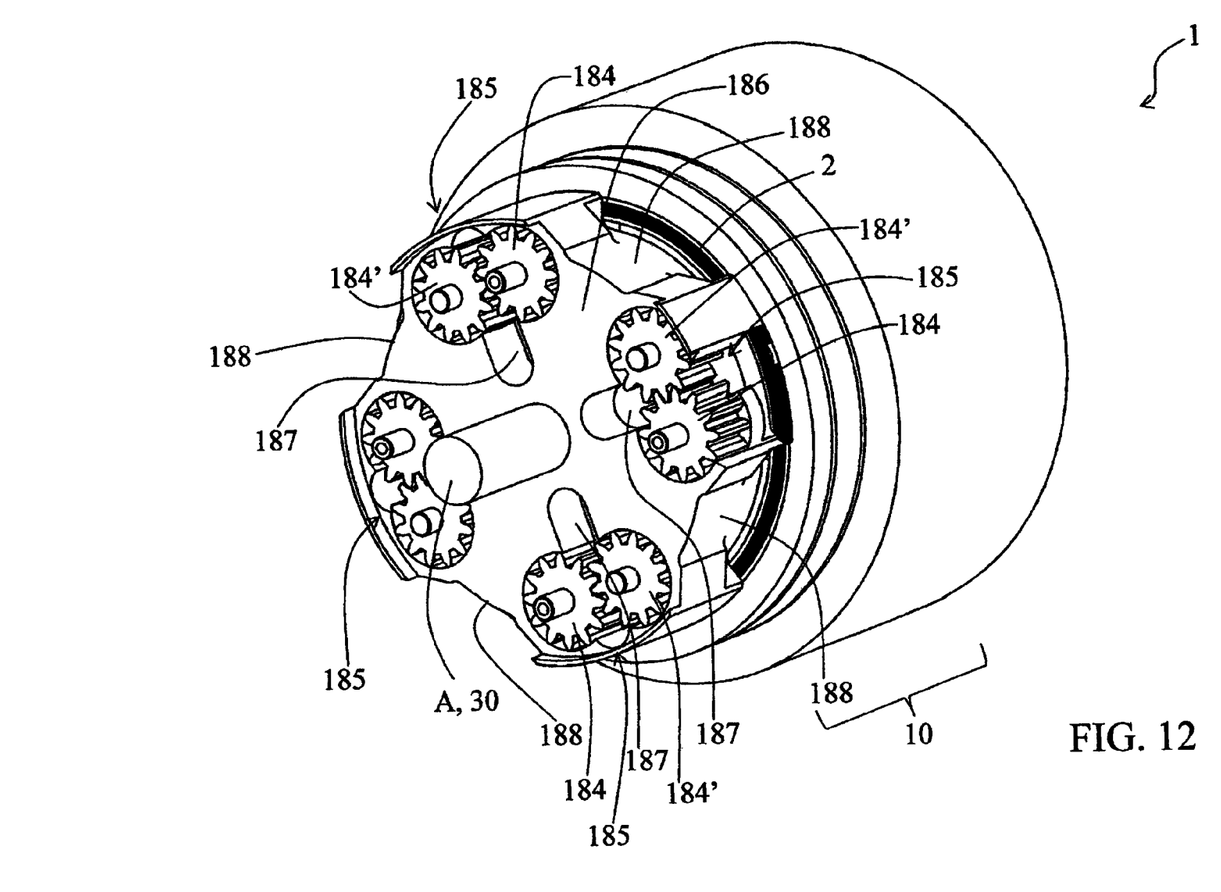
FIG. 12 is a partially exploded view of the generator from FIG. 10.

In the fourth embodiment illustrated in FIGS. 10 to 12, the means of forced circulation 180 simultaneously form the pushing means. In this embodiment, the means of forced circulation are made up of two assemblies 181 arranged on either side of the thermal stage 10. FIGS. 11 and 12 each represent a single assembly 181. The other assembly 181 is identical and offset by an angle of 45° in relation to the central axis A. The assembly 181 illustrated comprises four gears 185 arranged around the central axis A and integrated in a support 186 rotated by the drive shaft 30. Each gear 185 comprises two toothed wheels 184 and 184' and one 184 of the toothed wheels is fixedly connected in rotation to a planet gear 182 that meshes with an inner crown gear 183 (the teeth of which are not illustrated on the figures). This inner crown gear 183 is integral with the body 72 of the generator 1 so that the rotation of the support 186 drives the rotation of the planet gears 182 that mesh with the teeth of the fixed crown gear 183, and simultaneously the rotation of the toothed wheel 184 and thus the rotation of the associated toothed wheel 184' of each gear 185. Thus, each gear forms a pump that drives the fluid towards the thermal stage 10.

For this purpose, heat transfer fluid passages are located in the assemblies 181. In particular, these heat transfer fluid passages comprise a mixing chamber 187 for each gear 185, with the mixing chamber 187 being made within the thickness of the support 186 and fluidically connected with the corresponding gear 185 and the hot 5 or cold 6 chamber concerned, as well as indentations 188 made at the level of the radial face of the support 186, between the gears 185 (cf. FIG. 11). The supports 186 are arranged so as to be angularly offset by 45° so that when they are rotated around the central axis A, each active element 2 is positioned opposite one single gear 185. Thus, the heat transfer fluid pushed by a gear 185 located at the level of the hot exchange chamber 5 through an active element 2 emerges in an indentation 188 located on the side of the cold exchange chamber 6 and arrives in the cold exchange chamber 6 where it mixes with the fluid already present in this cold exchange chamber 6. Part of this heat transfer fluid is then drawn by the gears 185 into their mixing chamber 187 and pushed out towards the active elements 2, towards the hot exchange chamber 5. In this fourth alternative embodiment, the angular offset of the assemblies 181 allows, without the use of pistons, the heat transfer fluid being simultaneously pushed and mixed by the gears 185 that move in front of the active elements 2 when the support 186 rotates.

When it comprises pistons 70, the operation of the generator 1 consists in driving with a single actuator (not illustrated) the rotation of the magnetic arrangement 3 to create the heating and cooling cycles within the active elements 2, the rotation of the cams 71 to move the pistons 70 in reciprocating translation so as to push the heat transfer fluid through the active elements 2, the rotation of the means 8a to 8c to mix the heat transfer fluid in the tanks 74 and to place it in forced circulation, to homogenize its temperature between each thermal stage 10. When it comprises no pistons, the operation of the generator 1 consists in driving with a single actuator (not illustrated) the rotation of the magnetic arrangement 3 to create the heating and cooling cycles within the active elements 2 and the rotation of the angularly offset supports 186 to drive the gears 185 into rotation so as to push the heat transfer fluid through the active elements 2, to mix it in the mixing chambers 187 and to place it in forced circulation to homogenize its temperature between each thermal stage 10.

The stacking of several thermal stages 10 thus allows a cascade increase of the temperature gradient between the hot 5 and cold 6 exchange chambers placed at the ends and designed so that the calories and frigories collected can be transferred to external utilization circuits (heating, air-conditioning, tempering, etc.), either via conduction or via a heat exchanger (not illustrated).

The heat transfer fluid used is preferably a liquid. The heat transfer fluid will have a chemical composition that is adapted to the desired range of temperature so as to achieve a maximum heat exchange. This fluid may thus be a liquid, a gas or diphasic. If it is a liquid, one will for example use pure water for positive temperatures and water with antifreeze, for example a glycol-based product or a brine, for negative temperatures.

POSSIBILITIES FOR INDUSTRIAL APPLICATION

All the parts that form the heat generator 1 according to the invention can be mass produced using reproducible industrial processes. All these parts, except the active elements 2 and the magnetic means 3, 4 can be made from thermally insulating materials, moulded, injected or similar. The thermal stages 10 can be assembled by any suitable means of sealing and any known adequate means of attachment, such as tie rods 11 (cf. FIG. 1). The manufacture of the generator 1 with compact and stackable thermal stages 10, which can be standardized, makes it possible to satisfy a wide range of applications, both industrial and domestic, cost-effectively, with limited space requirements, and with a level of performance that is currently unrivalled in terms of calorific value for this type of generators.

The present invention is not limited to the examples of embodiment described but extends to any obvious modification and variation for a person skilled in the art without departing from the scope of protection, as defined by the annexed claims.

The invention claimed is:

1. A magnetocaloric generator (1) comprising:
   at least one thermal stage (10) being fitted with active elements (2) made of a magnetocaloric material and arranged around a central axis (A),
   a magnetic arrangement (3) supported by a drive shaft (30) being rotatable around the central axis (A) by an actuator and arranged to subject the active elements (2) to a variation in magnetic field,
   at least one heat transfer fluid contained in the generator (1) and being forced through the active elements (2) by pushing means (7, 180),
   at least one cold exchange chamber (6) and one hot exchange chamber (5) respectively coupled to external utilization circuits,
   a means for forcing circulation (8a, 8b, 8c, 180) of the heat transfer fluid, wherein the means for forcing circulation (8a, 8b, 8c, 180) are integrated in an inner volume of the generator (1), are coupled to the drive shaft (30) to be driven by the actuator rotating the magnetic arrangement (3), and comprising fluid passages (82, 87, 88, 187, 188) located inside the generator to facilitate circulation and simultaneous mixing of the heat transfer fluid inside the generator.

2. The generator according to claim 1, wherein the pushing means (7) comprise at least one piston (70) arranged to push the heat transfer fluid through the active elements (2) and be driven in reciprocating translation by at least one cam (94) coupled to the drive shaft (30), the means for forcing circulation (8c) comprise at least one piston pump with at least one central piston (90) freely supported by the drive shaft (30) and driven in reciprocating translation by the cam (94).

3. The generator according to claim 2, wherein the cam (94) comprises an inner crown gear (93) coupled for rotation with the drive shaft (30) by a planetary gear train (91, 92).

4. The generator according to claim 1, wherein the means forcing circulation (8b) comprise at least one planet gear (84) meshing with a drive gear (85) integral with the drive shaft (30) and associated with a pump housing (86) fitted with channels (87) for circulation of the heat transfer fluid, and the planet gear (84) associated with the pump housing (86) forms a gear pump.

5. The generator according to claim 1, wherein the pushing means (7) comprise at least one piston (70) arranged to force the heat transfer fluid through the active elements (2) and be driven in reciprocating translation by at least one cam (71) coupled for rotation to the drive shaft (30), the means for forcing circulation (8a) comprise small planet gears (80) arranged around the central axis (A), supported by a body (72) of the generator (1) and meshing with an inner crown gear (81) integral with the cam (71), and fluid passages (82), with each of the small planet gears (80) forming a mini gear pump.

6. The generator according to claim 5, wherein the means for forcing circulation (8a) comprise at least one turbine (83) coupled to the drive shaft (30).

7. The generator according to claim 1, wherein the means for forcing circulation (180) simultaneously forming the pushing means.

8. The generator according to claim 7, wherein the means for forcing circulation (180) comprise two assemblies (181) arranged on either side of the thermal stage (10) and angularly offset, each assembly (181) comprising planet gears (182) arranged around the central axis (A), meshing with an inner crown gear (183) integral with a body (72) of the generator (1) and each linked in rotation to one (184) of two toothed wheels (184, 184') of a gear (185) forming a mini gear pump, the gear (185) is integrated in a support (186) is driven in rotation by the drive shaft (30), and the assemblies (181) comprise passages enabling the heat transfer fluid to circulate between either the hot or the cold exchange chamber (5, 6) concerned and the active elements (2).

9. A magnetocaloric generator (1) comprising:
   at least one thermal stage (10) being fitted with active elements (2) made of a magnetocaloric material and arranged around a central axis (A) within a body, the active elements being rotationally fixed in relation to the body,
   a magnetic arrangement (3) being fixed to a drive shaft (30) such that the magnetic arrangement and the drive shaft are driven to rotate about the central axis (A) by an actuator, the magnetic arrangement and the active elements are arranged with respect to each other such that rotation of the magnetic arrangement subjects the active elements (2) to a variation in magnetic field,
   at least one heat transfer fluid contained in the generator (1) and being forced through the active elements (2) by pushing means (7, 180),
   at least one cold exchange chamber (6) and one hot exchange chamber (5) respectively coupled to external utilization circuits, and
   a circulator (8*a*, 8*b*, 8*c*, 180) that forces circulation of the heat transfer fluid, the circulator is located within an inner volume of the generator (1), the circulator is coupled to and rotationally driven by the drive shaft (30), and the force circulator displaces the heat transfer fluid through fluid passages (82, 87, 88, 187, 188) located inside the generator to facilitate circulation and simultaneous mixing of the heat transfer fluid inside the generator.

\* \* \* \* \*